United States Patent [19]

Mori et al.

[11] 4,101,170
[45] Jul. 18, 1978

[54] SEAT BELT DEVICE FOR USE IN VEHICLE

[75] Inventors: Mamoru Mori, Okazaki; Hiroshi Arai, Ohbu, both of Japan

[73] Assignee: Toyota Jidosha Kogyo Kabushiki Kaisha, Toyota, Japan

[21] Appl. No.: 762,337

[22] Filed: Jan. 25, 1977

[30] Foreign Application Priority Data

Feb. 19, 1976 [JP] Japan .............. 51-18752[U]

[51] Int. Cl.² .................................................. A62B 35/00
[52] U.S. Cl. ........................... 297/389; 24/114.5; 24/230 R
[58] Field of Search ............... 297/385, 388, 389; 280/744, 747; 24/198, 114.5, 230 R, 77

[56] References Cited

U.S. PATENT DOCUMENTS

| 531,753 | 1/1895 | Smith | 24/114.5 |
|---|---|---|---|
| 3,290,696 | 12/1966 | Rosenzweig | 24/198 |
| 3,531,060 | 9/1970 | Foster | 24/114.5 |
| 3,646,644 | 3/1972 | Watts | 24/114.5 |
| 3,888,541 | 6/1975 | Stephenson | 297/389 X |
| 3,929,351 | 12/1975 | Fricko | 297/389 X |

FOREIGN PATENT DOCUMENTS 2,401,578   7/1974   Fed. Rep. of Germany ....... 297/389

*Primary Examiner*—James T. McCall
*Attorney, Agent, or Firm*—Stevens, Davis, Miller & Mosher

[57] ABSTRACT

A seat belt device for holding an occupant of a seat of a vehicle by the shoulder and the waist portions thereof by stringing a belt in a loop fashion, wherein a stopper is provided on a shoulder belt portion thereof between a sash guide and a tongue plate so that the position on said shoulder belt where said stopper is detained can be adjusted by shifting the belt in the longitudinal direction thereof and said stopper cannot pass through an opening in said tongue plate, thereby avoiding imparting a feeling of oppression by the shoulder belt portion to the occupant wearing the seat belt.

3 Claims, 3 Drawing Figures

SEAT BELT DEVICE FOR USE IN VEHICLE

The present invention is related to a seat belt device for use in a vehicle and, more particularly, to an improvement on such a seat belt device in which one belt is strung in a loop fashion so as to hold the occupant of the seat of the vehicle by the shoulder and the waist portions and one coupling ends of the shoulder belt and the lap belt portions thereof are wound up on the shaft of a single retractor while being overlapped one on the other.

The arrangement of a seat belt device in which one seat belt is strung in a loop fashion so as to hold the occupant of the seat of the vehicle by the shoulder and the waist portions thereof and one coupling ends of the shoulder belt and the lap belt portions are overlapped one on the other and wound up on the shaft of a single retractor has been already proposed. However, in such a type of seat belt arrangement for vehicles, there is a disadvantage in that since the retractor winds up the shoulder belt portion and the lap belt portion simultaneously and the winding force acts intensely on the belt, a relatively strong feeling of oppression is imparted to the shoulder portion of the occupant who wears the seat belt.

Accordingly, an object of the present invention is to provide a seat belt device for vehicles of a simplified construction which can very well eliminate such a feeling of oppression which has been heretofore imparted by the conventional seat belt device to the occupant of the seat wearing the seat belt.

These and other objects and features of the present invention will be fully understood from the following detailed description of the invention taken with reference to the accompanying drawings, in which.

Figure 2:
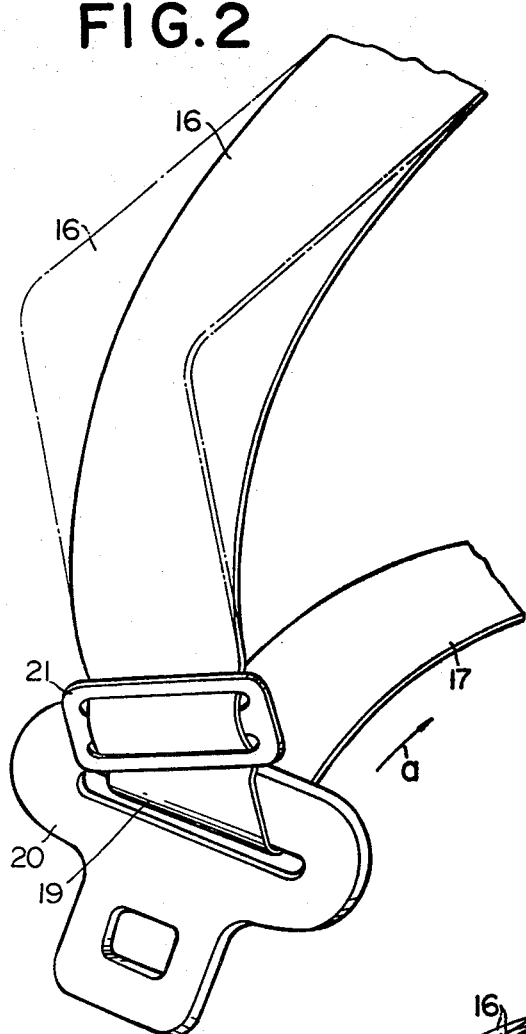
FIG. 2 is an enlarged oblique view of the seat belt device shown in FIG. 1, showing the major parts thereof in greater detail.
Figure 1:
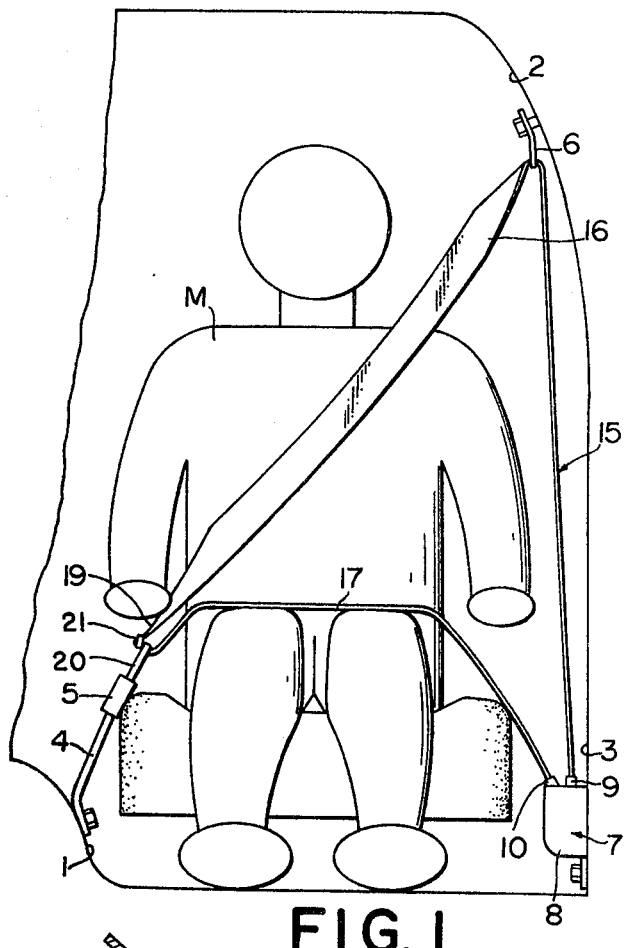
FIG. 1 is a front elevation of a preferred embodiment of the seat belt device according to the present invention showing the state of the belt in use.

Referring now to the accompanying drawings, a buckle means 5 is coupled to the bottom member 1 in the car passenger compartment through a coupling piece 4. Attached to the top member 2, is a sash guide means 6, and a retractor 7 is mounted onto a structural member 3 such as the rocker panel.

Said retractor 7 comprises a retractor body 8 having a first belt guide port 9 and a second belt guide port 10, and a winding shaft 11 of a hollow member having in a portion of the peripheral wall thereof an axially disposed belt take-out port 12 and rotatably borne on said retractor body 8, and a rotatable shaft 13 disposed coaxially in said winding shaft 11 so as to define with the inner wall of said winding shaft 11 a peripheral gap 14 into which one coupling portion 18 of the belt 15 can be introduced. Said winding shaft 11 and said rotatable shaft 13 constitute one unit of shaft mechanism.

The belt 15 has the shoulder belt portion 16 thereof passed through the sash guide 6 and, then, introduced into said retractor 7 from said first belt guide port 9. The lap belt portion 17 of the belt 15 is introduced into said retractor 7 from said second belt guide port 10. Thus, the belt 15 is strung in a loop fashion so that said shoulder belt portion 16 and the lap belt portion 17 hold the occupant M of the seat of the vehicle by the shoulder and the waist portions.

In said retractor 7, said shoulder belt portion 16 and his lap belt portion 17 on one coupling portion side 18 of belt 15 are overlapped one on the other and wound up on said winding shaft 11 in an overlapped state and folded back at said belt take-out port 12. Said one coupling portion 18 of the belt 15 formed in a ring shape is introduced into said peripheral gap 14 and fitted onto said rotatable shaft 13.

Further, said belt 15 is provided with a tongue plate 20 between said sash guide 6 and said second belt guide port 10 on the other coupling side 19 thereof.

A novel feature of the seat belt device according to the present invention is that, in the aforementioned arrangement of the seat belt device, a stopper 21 of a size which will not pass through an opening in said tongue plate 20 is provided on said shoulder belt portion 16 of the seat belt 15 between said sash guide 6 and said tongue plate 20 in such a manner that the position on the belt where the stopper 21 is detained can be adjusted by shifting the belt in the longitudinal direction thereof.

According to the aforementioned arrangement of the seat belt device for vehicles, the shoulder belt portion 16 and the lap belt portion 17 of the seat belt 15 are strung over the shoulder and the waist portions of the occupant M, respectively, in use. Then, the tongue plate 20 is engaged with the buckle means 5, and the stopper 21 is shifted toward the tongue plate 20 so that the shoulder belt portion 16 can slacken to some extent. Also, the stopper 21 is pushed against the tongue plate 20 and detained there.

Figure 3:
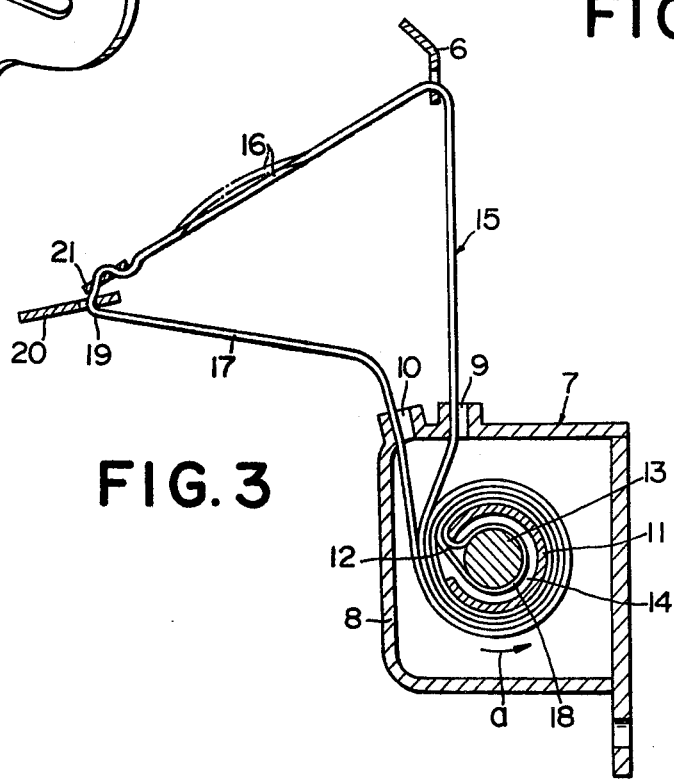
FIG. 3 is a schematic view of the seat belt device shown in FIG. 1, showing the loop arrangement thereof.

When the seat belt 15 is put on by the occupant of the seat of the vehicle, as shown in FIG. 3, since the stopper 21 is caught by the tongue plate 20, the retractor 7 cannot wind up the lap belt portion side 17 in excess of a predetermined amount, even though the winding force is always exerted by the retractor 7 on the belt 15 in the direction indicated by an arrow a. As a result, due to the action of the stopper 21, the shoulder belt portion side 16 is also rendered unsusceptible to the winding force and, thus, the shoulder belt 16 can retain the predetermined slack so that the shoulder of the occupant M can be free of the feeling of oppression.

Also, when the seat belt is removed from the occupant M, since the tongue plate 20 and the stopper 21 are freed from each other, the belt 15 can be retracted by the retractor 7 to the normal wound-up position thereof without being hindered by the presence of the stopper 21.

As fully described hereinbefore, according to the seat belt device arrangement according to the present invention, the stopper 21 is detained by the tongue plate 20 so that the lap portion side 17 cannot be wound up in excess of a predetermined amount and, therefore, a pre-adjusted slack of the shoulder belt portion 16 can be retained, so that the feeling of oppression can be very well prevented from being exerted by the belt 15 on the shoulder of the occupant M wearing the seat belt.

Further, according to the present invention, the aforementioned object can be achieved effectively by a simplified construction in which only a stopper 21 is provided on the seat belt 16 between the sash guide 6 and the tongue plate 20 in such a manner that the position on the shoulder belt portion where the stopper is detained is the only adjustment that needs to be made.

What I claim is:

1. A seat belt device for use in a vehicle comprising:
a single retractor for taking up both a shoulder belt and a lap belt, said belts restraining a shoulder portion and a waist portion of an occupant and being formed to be continuous, said retractor having a single take-up shaft for simultaneously taking up said two belts;
a sash guide above the occupant's shoulders having a slit through which the belt freely passes;
a tongue plate for engaging with a buckle means and having an opening through which said belt freely passes; and
stopper means on the belt between the tongue plate and the sash plate, said stopper means being separate from the tongue plate and linearly moveable along the belt by manual manipulation but not so moveable due to pressing force by the tongue plate, said stopper means being of such a configuration that it will not pass through the tongue plate opening, said stopper means being moveable to such a position along said belt that the shoulder portion thereof has sufficient length between the tongue plate and the retractor that the shoulders of the occupant are not unduly pressed by the belt upon attachment thereof.

2. A seat belt device according to claim 1, wherein said sash guide is anchored to the top member of the vehicle.

3. A seat belt device according to claim 1, wherein said retractor is anchored to the bottom member of the vehicle.

* * * * *